UNITED STATES PATENT OFFICE.

AUGUSTE BOIDIN, OF SECLIN, FRANCE, AND JEAN EFFRONT, OF BRUSSELS, BELGIUM.

PROCESS FOR TREATING AMYLACEOUS SUBSTANCES.

1,227,374.   Specification of Letters Patent.   Patented May 22, 1917.

No Drawing.   Application filed November 6, 1913. Serial No. 799,490.

*To all whom it may concern:*

Be it known that we, AUGUSTE BOIDIN, a citizen of the Republic of France, residing a Seclin, Nord, France, and JEAN EFFRONT, a subject of the King of Belgium, residing at Brussels, Belgium, have invented new and useful Improvements in Processes for Treating Amylaceous Substances, of which the following is a specification.

Our invention relates to improvements in processes for treating amylaceous substances, and it consists in the steps hereinafter enumerated.

An object of our invention is to provide a process for treating amylaceous substances in which use is made of liquefying enzyms of bacterial origin.

A further object of our invention is to provide a process of the type described in which the enzyms act in alkaline media or in media from which the acid and other substances poisonous toward some of the bacterial enzyms are eliminated.

Other objects and advantages will appear in the following specification, and the novel features of the invention will be particularly pointed out in the appended claims.

It is well known that the "cereal enzyms" which are secreted by malted vegetables such as barley, rye, maize (which are practically the only enzyms used in manufactures) are only efficient when acting in neutral or slightly acid media. We have discovered that the "bacterial enzyms", that is to say the enzyms produced by many kinds of bacteria, have the property of liquefying starch only when the medium is kept alkaline or when the soluble constituents of the cereals which show an acid reaction have been eliminated.

The present process completely differs from the methods previously known in which alkali is used in order to dissolve the starchy or nitrogenous constituents of the raw material previously to treating it by diastase, by the fact that in these processes the mash is always saturated, or, what is more accurate, the mash is rendered slightly acid before adding the aqueous solution of malted cereal, vegetable enzyms being not efficient in alkaline media.

It is disclosed by our French Patent, No. 399,087 of 1909 that when cultivating liquefying bacteria on whole (not ground) grains of rice or of wheat, a disaggregation of these slightly acid grains takes place as the result of the proteolytic cytases and enzyms secreted by these bacteria. It is also known that when allowing a solution of these enzyms to react on rice for two to four hours at a temperature varying from 40 to 50° C., the disaggregation thus obtained facilitates the subsequent liquefaction of the starch. But when trying to operate on an industrial scale, we have met with a series of difficulties and we have found that this method does not give regular results with rice and that it is not at all suitable for other grains, such as maize, even when the latter has been previously crushes or reduced to flour.

By a systematic study of these phenomena, we have been led to the conclusion that this preliminary disaggregation lessens considerably the value of the spent grains (refuse or insoluble dried refuse) by a useless dissolution of varied cellulosic and nitrogenous substances, and that this disaggregation may be dispensed with by operating in compliance with the three following conditions:

It is necessary, to use bacteria belonging to the species "*subtilis*" or "*mesentericus*",—to heat directly in an alkaline medium the mixture of ground grain and of liquefying enzym,—to raise this mixture from the beginning of the treatment to such a high temperature that the cytases, proteolytic enzyms and diastase of dislocation, cannot have any action upon the cellulosic and nitrogenous constituents of the cereals.

When operating according to the three conditions, we can treat with equal facility every kind of grain or amylaceous substance and we get results diametrically different from those known, in this sense that, without any loss of spent grain, we obtain a far better liquefaction and we spend far smaller quantities of enzym, which considerably reduces the expense. As an instance of the fact that smaller quantities of enzym are employed in the present invention than were necessary in former processes, as for instance, the French Patent, No. 399,087, cited, we may state that where one thousand pounds of grain are treated it was necessary to employ one hundred to two hundred gallons of enzymatic liquid in order to obtain only a pasty and thick mash in the French patent, cited, whereas by the present process we now obtain a very full mash by using only from ten to twelve gallons of enzymatic liquid for the liquefaction of one thousand pounds of grain. In order to obtain such good and regular results, we cultivate the species selected by those which furnish large quantities of starch liquefying enzym, and we have found that the best kinds of bacteria belong to those of the species "*subtilis*" and "*mesentericus*" which may live in an alkaline or neutral medium, and which form thick veils and rapidly develop when growing at the surface of nutrient media.

By cultivating many different bacteria of the common kinds belonging to these two species in highly nitrogenized media, rich in casein or amids, and containing only small quantities of amylaceous substances, the liquefying power of the enzyms produced is raised and this liquefying power becomes gradually greater and greater as new cultures are made, under favorable conditions with a more rapid reproduction of the microbes. We thus impart by a kind of acclimatization an extraordinary liquefying power to vulgar species and then these are rendered utilizable for industrial purposes.

The maximum liquefying power is obtained under the following conditions:

1. Repeated cultures of the bacteria on raw material strongly nitrogenized and relatively poor in carbohydrates.

2. Cultivation on large surfaces, in thin layers and in presence of an excess of air at the commencement, and a diminution of the quantity of oxygen afforded to the bacteria as soon as the latter are completely developed.

3. If our bacteria are sown in a liquid wort and large quantities of air are passed through this wort only an insignificant quantity of bacteria and of liquefying enzyms is produced, and the liquid becomes slightly acid. The life of the microbe is quite different when it grows in films. It then produces large quantities of liquefying enzyms and the wort becomes alkaline and the enzyms thus produced are able to dissolve starch in alkaline media.

4. The culture is to be made between 25° and 40° C.; the quantity of liquefying enzyms appears to be higher when a temperature of about 30° is not exceeded, for the larger part of the species we have tried.

5. The quantity of liquefying enzyms obtained is as much higher as the nutrient medium is richer in assimilable nitrogenous substances. All the raw materials which only contain one part of nitrogen to 35 to 45 parts of carbohydrates give solutions of feeble activity and in which the secretion of the enzyms is very slow. On the other hand the raw materials which contain one part of nitrogen to 10 to 15 parts of carbohydrates yield solutions very rich in enzyms. Among these latter may be mentioned vegetable or animal albumins, the caseins, maizefibrin, boiled yeast, soja and especially soja cake.

The enzymatic liquid once produced, may be preserved for several months by the addition of 10 to 15 per cent. of salt or of 4 to 10 grams of formalin per liter of enzymatic liquid. The enzyms may be precipitated from the solution by salts, such as sulfate of ammonia, for example, or evaporated in vacuum.

By complying with the conditions above explained, we get solutions showing a great liquefying power on starch. When it is required to produce saccharification instead of a simple liquefaction it is necessary to promote in the bacterial culture a very intense saccharifying power. We increase the saccharifying power of bacterial cultures in the proportion of 1 to 50 by operating as follows:—

When our cultures have reached their maximum liquefying power, we add 8 to 15 per cent. of common salt (or other salts such, for example, as sulfate of soda) then nitrogeneous raw material, as soja cake, for instance, in such quantity that the whole forms a thick paste and the whole is left during 24 hours at the least, at about 30° C., care being taken to prevent as much as possible the contact of the air. By this means the liquefying power will be considerably lessened but a saccharifying power comparable to that of a well malted barley is produced.

In order to simplify the description of our method of utilizing liquefying enzyms of bacterial origin, we give below two examples of the operative methods which can be followed for the treatment of raw materials used in distilleries.

*First example.*

One thousand pounds of finely ground maize are heated between 75° and 85° C., with 450 gallons of water. There is then added 6 to 10 pounds of dried carbonate of soda, or of any other chemical compound capable of producing an alkaline reaction in the mixture. We add then to this mixture a small quantity of liquefying enzymatic liquid (12 to 20 gallons) and the liquefaction is effected in a few minutes. As soon as the mash becomes quite liquid, it is neutralized with any suitable acid, such as hydrochloric acid, then heated at about 100° or 120° C., to insure the dissolution of any starch granules which may not have been liquefied owing to imperfect crushing. It is sufficient to treat the mash thus prepared either with a decoction of malt employed in small quantity, or with fungi as in our U. S. Patent, No. 621,796 (1899), or any other source of enzyms, and afterward by the yeast in order to produce mashes or worts completely free from starch after fermentation, furnishing a maximum yield in alcohol and in spent grains or insoluble dried refuse.

We say that we employ reduced quantities of malt because if in the ordinary process it is customary to employ 10 per cent. of a given malt, it will be sufficient to employ 2 to 3 per cent. of this same malt to thoroughly saccharify the starchy materials already liquefied by our bacterial enzyms prepared as above described.

We can also dispense with the malt and replace it by a saccharifying culture obtained as above described and employed in a very small quantity.

Instead of directly effecting the liquefaction of the maize or other cereal ground in a dry state, it has been found preferable to steep the cereal before crushing it, the loss due to the production of dust during the crushing operation is thus avoided and we thus effectually destroy with a reduced expense of motive power the horny parts of the grain, and we more effectually set free the starch granules without reducing the bran to flour.

This preliminary steeping can be effected in various ways, either in cold or hot water, and with a quantity of water necessary to increase the weight of the grain from 25 to 30 per cent., or with an excess of water. It is preferable to effect the soaking with an excess of water and under heat because we can then eliminate after steeping the remaining water containing the extractive constituents of the grain. We have ascertained that this aqueous extract paralyses the action of our bacterial enzyms. This elimination permits, at the same time, the reduction of the proportion of alkali to be employed for the liquefaction and the proportion of enzyms, and, what is more, as the residual water set apart is acid, it can be added to the mash as soon as the liquefaction is produced, in order to neutralize the alkali previously employed.

By maintaining the mixture of water and grain at about 65° to 75° C., during the soaking, we have further the advantage of precipitating the nitrogenous substances and those of the phosphates which may be modified by the heat. The albuminous substances being rendered insoluble, they do no longer precipitate the enzyms, and the phosphates having been dissociated in the state of insoluble polybasic phosphates of Berthelot, which remain in the insoluble parts of the cereal and in the state of acid phosphate which pass into the liquid, the quantity of alkali to be used becomes far smaller. When working with very hard waters, the addition of alkali may become optional, because the grain has been rendered alkaline during the soaking. Moreover even in this latter case a slight addition of alkali is always advantageous in order to get rapidly a very fluid mash.

The soaking under heat can be effected on either whole or crushed grain. It has been found preferable to effect it on whole grain for the quantity of glucose which is found at the end of the steeping is as much greater as the grain is more finely ground; ex., thus by putting into a first receiver 100 grams of finely ground maize and 200 grams of water and into another receiver 100 grams of whole maize and 200 grams of water, we have found after twelve hours at 65° to 67° C., 7.6 grams of glucose in the liquid of the first receiver, and 2.2 grams in that of the second. As this sugar is rapidly destroyed by the heat in the cooker, it is advisable to steep in whole grain.

Consequently we have been led to adopt the following mode of treatment:

*Second example.*

One thousand pounds of unground maize or other amylaceous substances are steeped, during 4 to 12 hours at about 70° to 80° C., in about 300 to 450 gallons or more of water. After the separation of the water, which may be renewed one or several times (methodical diffusion), we crush the raw material by means of grinding mills or cylinders. The flour is delivered into water maintained at about 80° C., and a small quantity of carbonate of soda, 2 to 4 pounds at the most, and 5 to 10 gallons of bacterial enzymatic liquid are added.

The liquefaction being obtained, we neutralize by addition of any suitable acid, either mineral or organic, or by addition of steeping water or spent wash and we proceed in the manner above described.

It is to be noted that if we proceed by a preliminary soaking and if we then suppress the temporary elimination of the steeping water it is necessary in order to obtain a good liquefaction, to use at least as much alkali as in the first example.

Among the advantages obtained by the present processes, we may mention:

A shortened cooking and economy of coal.

Increase of the yield in spirits due to the non-destruction of the sugar pre-existing in the grain, these sugars (glucose and levulose) becoming easily unfermentable by heating in the cooker (or converter).

Increase in the quantity of spirit arising from the fact that before fermentation a more complete solubilization and saccharification of the starch takes place and because there is no trace of starch remaining in the spent grain.

Reduction of the quantity of malt,

Increase in the value of residue (or spent grain) due to a higher content in fatty constituents and because the oil remains undecomposed, that is to say it is not converted into soap and finally the oil is paler and consequently more marketable.

By the shortened cooking a considerable improvement of the taste of the alcohol is obtained on account of the non-formation of nitrogenized resins. The alcohol has a still better taste because the initial mashes are less acid than those obtained by cooking at high pressure.

The liquid spent wash is more digestible and more appetizing for the cattle and the solid and dried spent grain has a greater nutritive value, because it is richer in carbohydrates as in assimilable and non-fermentable gums.

In order to get good results by using liquefying enzyms of bacterial origin (which are much more powerful than vegetable enzyms of the malted cereals), it is convenient to effect the steeping under such conditions that the mass of grain becomes hydrated everywhere with the same rapidity in order that the grinding may be as perfect as possible.

The grain is preferably soaked in warm water. This water ought to be as hot as possible without, however, reaching a temperature sufficient to transform the starch into paste (see the table 9th edition of *Maerker*, page 10).

Soft or tender cereals are sufficiently steeped when they have taken up 25 to 30 per cent. of their weight of water, and for horny grain, the quantity of water to be absorbed should be between 45 to 60 per cent.

Finally, in order to obtain an equally rapid hydratation throughout the mass of grain and to prevent at the same time infection in the steeping vats, it is necessary to maintain, by a constant and mechanical circulation of the steeping water, an equal temperature at all points of the mass. It is evident that if there exists at the upper part of the steeping vat a temperature of 70° C., and that in the bottom the temperature is only 45° C., an intense butyric fermentation would soon take place and this fact would be prejudicial to the quality of the spirit.

In the present process of liquefaction, the enzym can be used alone or the mixture of enzym and bacteria. In carrying out our process, however, we preferably use a mixture containing the enzym and the bacteria, because it avoids the necessity of filtration and produces substantially as good results as where the enzym is used alone.

The process herein described forms the subject of a French application for patent, Number 461,853, filed November 7, 1912.

We claim:

1. A process of treating amylaceous substances consisting in steeping the amylaceous substance at a temperature slightly lower than the gelatinizing point of the starch of this substance and in liquefying this steeped substance in alkaline water at a temperature of at least 80° C., under the action of bacterial enzyms having a great liquefying power.

2. A process of treating amylaceous substances consisting in steeping the amylaceous substance in hot water, and in liquefying this steeped substance in alkaline water under the action of bacterial enzyms, these enzyms being obtained by the repeated culture of common liquefying bacilli on highly nitrogenized media in veils and in thin layers under the influence of a current of air, the supply of which is diminished when the development of the bacilli is complete.

3. A process of treating amylaceous substances consisting in soaking the amylaceous substance in hot water for from four to eight hours, separating the water in excess, grinding the steeped substance in a moist condition, mixing the crushed substance with hot water to which is added a little alkaline salt and liquefying enzyms, leaving the resulting substance to become liquid under the influence of the said enzyms, and neutralizing the solution obtained.

4. A process of treating amylaceous substances consisting of steeping the amylaceous substance in hot water, liquefying this steeped substance in alkaline water under the action of bacterial enzyms, at a temperature of at least 80° C., neutralizing the obtained mash and saccharifying it by means of liquefying enzyms transformed into saccharifying enzyms by the addition of salts and non-fermented nitrogenous raw material.

5. A process of treating amylaceous substances consisting in steeping the amylaceous substance in hot water for from four to eight hours separating the water in excess, liquefying this steeped substance in alkaline water, at a temperature of at least 80° C., under the action of bacterial enzyms and neutralizing the wort thus obtained by the addition of spent wash or of the acid and aqueous extract obtained by the steeping of the amylaceous substance.

In testimony, that we claim the foregoing as our invention we have signed our names in presence of two subscribing witnesses.

AUGUSTE BOIDIN.

Witnesses to the signature of Auguste Boidin:
FELIX FIQUET,
LUCIER TRIFIER.

Witnesses to the signature of Jean Effront:

JEAN EFFRONT.
FERMAND JOSEPH LABARY,
ALFRED DE SARVILLER.